(12) United States Patent
Baughman et al.

(10) Patent No.: US 11,514,314 B2
(45) Date of Patent: Nov. 29, 2022

(54) MODELING ENVIRONMENT NOISE FOR TRAINING NEURAL NETWORKS

(71) Applicant: International Business Machines Corporation, Armonk, NY (US)

(72) Inventors: Aaron K. Baughman, Cary, NC (US); Gary William Reiss, Buford, GA (US); Shikhar Kwatra, Durham, NC (US); Qiqing Christine Ouyang, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 487 days.

(21) Appl. No.: 16/693,412

(22) Filed: Nov. 25, 2019

(65) Prior Publication Data

US 2021/0158143 A1 May 27, 2021

(51) Int. Cl.
*G06N 3/08* (2006.01)
*G10L 21/0208* (2013.01)
(Continued)

(52) U.S. Cl.
CPC ............. *G06N 3/08* (2013.01); *G10L 15/20* (2013.01); *G10L 21/0208* (2013.01)

(58) Field of Classification Search
CPC ........ G06N 20/00; G06N 3/0454; G06N 3/08; G06N 3/0472; G10L 21/0208; G10L 15/20; G06K 9/6256; G06K 9/6215; G06K 9/6272; G06K 9/6284; G06F 17/18; G06F 17/10; G05B 17/02; G06V 10/30; G06V 10/82

(Continued)

(56) References Cited

U.S. PATENT DOCUMENTS 7,289,955 B2 10/2007 Deng
8,234,112 B2 7/2012 Kang
(Continued)

FOREIGN PATENT DOCUMENTS

| CN | 101593360 B | 5/2012 |
| CN | 108388720 A | 8/2018 |

(Continued)

OTHER PUBLICATIONS

Atla et al. "Sensitivity of Different Machine Learning Algorithms to Noise", The Journal of Computing Sciences in Colleges CCSC, vol. 26, No. 5, May, p. 96-103 (Year: 2011).*

(Continued)

*Primary Examiner* — Leshui Zhang
(74) *Attorney, Agent, or Firm* — Monchai Chuaychoo

(57) ABSTRACT

An approach for altering alter training data and training process associated with a neural network to emulate environmental noise and operational instrument error by using the concepts of shots to sample within a squeezed space model, wherein shots are an uncertainty index that is the average of all shots from a sampling, is disclosed. The approach leverages a squeeze theorem to create a squeezed space model based on the regression of the upper and lower bound associated with the environmental noise and instrument error. The approach calculates an average noise index based on the squeezed space model, wherein the index is used to alter the training data and process.

20 Claims, 7 Drawing Sheets

(51) Int. Cl.
*G06V 10/764* (2022.01)
*G10L 15/20* (2006.01)

(58) Field of Classification Search
USPC ......... 706/25, 15, 16, 18, 19, 20, 21, 22, 24
See application file for complete search history.

(56) References Cited

U.S. PATENT DOCUMENTS

| | | | | |
|---|---|---|---|---|
| 2014/0160250 | A1* | 6/2014 | Pomerantz | H04N 5/23218 |
| | | | | 348/222.1 |
| 2014/0278395 | A1* | 9/2014 | Zurek | G10L 15/20 |
| | | | | 704/231 |
| 2016/0171974 | A1* | 6/2016 | Hannun | G06N 3/084 |
| | | | | 704/232 |
| 2016/0378201 | A1 | 12/2016 | Baughman | |
| 2018/0375986 | A1* | 12/2018 | Blanco | H04M 1/72433 |
| 2021/0065681 | A1* | 3/2021 | Soni | G06K 9/6228 |

FOREIGN PATENT DOCUMENTS

| | | | | | |
|---|---|---|---|---|---|
| CN | 108417224 | A | * | 8/2018 | ............. G06N 3/049 |
| CN | 108898214 | A | * | 11/2018 | |
| CN | 109191411 | A | * | 1/2019 | ............... G06T 5/50 |
| JP | 3548459 | B2 | | 7/2004 | |
| JP | 4865038 | B2 | | 2/2012 | |
| KR | 100596185 | B1 | | 7/2006 | |

OTHER PUBLICATIONS

Wang, "Machine Learning Basics", http://www.whdeng.cn/Teaching/PPT_01_Machine%20learning%20Basics.pdf, p. 1-51, Jan. 5 (Year: 2015).*
Jun et al., "Automated Routing Protocol Selection in Mobile Ad Hoc Networks", SAC'07 Mar. 11-15, 2007, Seoul, Korea, Copyright 2007 ACM 1595934804/07/0003, 8 pages.
Talbo et al., "Shot noise behavior in single-electron quantum dot-based structures", Published in 2012 15th International Workshop on Computational Electronics, May 22-25, 2012, Date Added to IEEE Xplore: Jul. 19, 2012, DOI: 10.1109/IWCE.2012.6242828, Madison, WI, USA, 4 pages.

* cited by examiner

MODELING ENVIRONMENT NOISE FOR TRAINING NEURAL NETWORKS

BACKGROUND

The present invention relates generally to the field of machine learning, and more particularly to applying squeezed space model to later training data.

Training a neural network with a small dataset (or large dataset) can cause the network to memorize all training examples, in turn leading to overfitting/underfitting and poor performance on a dataset. Small or large datasets may also represent a harder mapping problem for neural networks to learn, given the sparse sampling of points in the input space. One approach to making the input space smoother and easier to learn is to add noise to inputs during training.

The most common type of noise used during training is the addition of Gaussian noise to input variables. Gaussian noise, or white noise, can be generated as needed using a pseudorandom number generator. The amount of noise added is a user configurable parameter. Too little noise has no effect, whereas too much noise makes the mapping function too challenging to learn by the neural network.

SUMMARY

Aspects of the present invention disclose a method, computer program product, and system for training a neural network based on introducing noise. The method includes modeling environmental noise and internal system noise with a first and second polynomial regression to generate an upper bound function and a lower bound function, respectively; modeling user noise with a third polynomial regression to generate a noise function; applying the upper bound function and the lower bound function to the noise function to generate a squeezed noise function; detecting anomalies within a training data during an online training; generating sample values from the detected anomalies; mapping the sample values to a squeezed space model via the squeezed noise function to calculate an average noise index within the sampling space bounded by the squeezed noise function; and applying the average noise index to the training data during training to alter the training data, emulating a noisy environment.

In another embodiment, the computer program product includes one or more computer readable storage media and program instructions stored on the one or more computer readable storage media, the program instructions comprising: program instructions to model environmental noise and internal system noise with a first and second polynomial regression to generate an upper bound function and a lower bound function, respectively; program instructions to model user noise with a third polynomial regression to generate a noise function; program instructions to apply the upper bound function and the lower bound function to the noise function to generate a squeezed noise function; program instructions to detect anomalies within a training data during an online training; program instructions to generate sample values from the detected anomalies; program instructions to map the sample values to a squeezed space model via the squeezed noise function to calculate an average noise index within the sampling space bounded by the squeezed noise function; and program instructions to apply the average noise index to the training data during training to alter the training data, emulating a noisy environment.

In yet another embodiment, the computer system includes one or more computer processors; one or more computer readable storage media; program instructions stored on the one or more computer readable storage media for execution by at least one of the one or more computer processors, the program instructions comprising: program instructions to model environmental noise and internal system noise with a first and second polynomial regression to generate an upper bound function and a lower bound function, respectively; program instructions to model user noise with a third polynomial regression to generate a noise function; program instructions to apply the upper bound function and the lower bound function to the noise function to generate a squeezed noise function; program instructions to detect anomalies within a training data during an online training; program instructions to generate sample values from the detected anomalies; program instructions to map the sample values to a squeezed space model via the squeezed noise function to calculate an average noise index within the sampling space bounded by the squeezed noise function; and program instructions to apply the average noise index to the training data during training to alter the training data, emulating a noisy environment.

BRIEF DESCRIPTION OF THE DRAWINGS

FIG. 6 is a flowchart illustrating an alternative embodiment of the operation of a squeeze noise and training environment, designated as 600, in accordance with an embodiment of the present invention.

DETAILED DESCRIPTION

Figure 1:
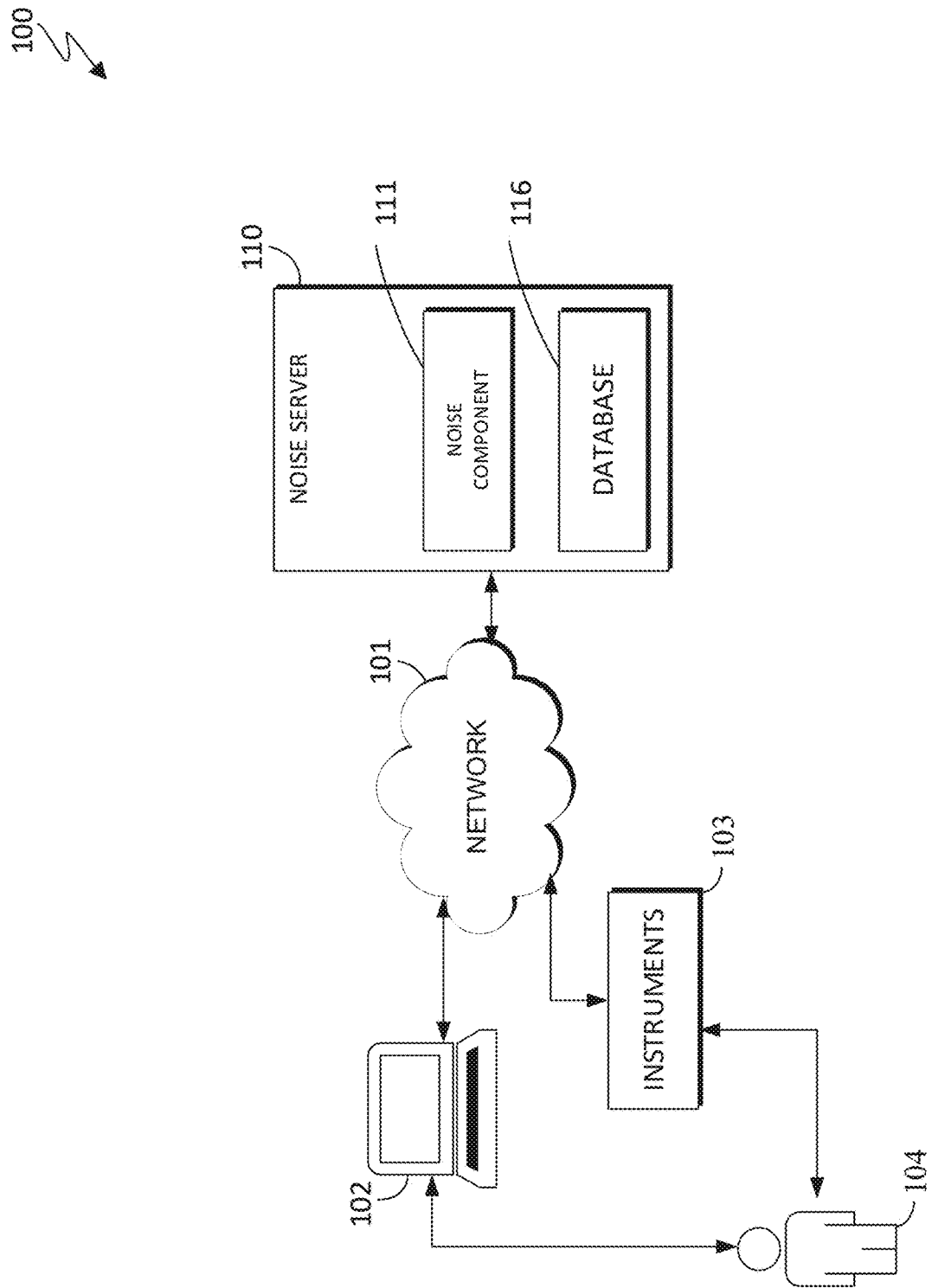
FIG. 1 is a functional block diagram illustrating a topology of a squeeze noise environment, designated as 100, in accordance with an embodiment of the present invention.

Embodiments of the present invention provides an approach to minimize bias (e.g., overfitting or underfitting) in a noisy dataset associated with training (e.g., online, off-line) a neural network by leveraging a squeezing function (i.e. squeeze shots) to generate random noise. By introducing noisy data (generated by a squeezing function) into a large scaled data set, the approach can train a neural network to distinguish normal (i.e., target) data from background data and incrementally, the neural network can improve learning over an interval. For example, the neural network can be trained to recognize objects in a video/image file even with parts of the object is obscured by snow or debris (i.e., noisy data).

Overfitting refers to a model that models the training data too well. Overfitting happens when a model learns the detail and noise in the training data to the extent that it negatively impacts the performance of the model on new data. This means that the noise or random fluctuations in the training data is picked up and learned as concepts by the model. Underfitting refers to a model that can neither model the training data nor generalize to new data. An underfit machine learning model is not a suitable model and will be obvious as it will have poor performance on the training data.

In a tradition neural network learning as it relates to object identification in an image, a single "shot" is an attempt to teach (i.e., train) machine learning to recognize an object correctly. This may take one attempt (i.e., one shot) or multiple attempts (i.e., k shots) for the machine learning to accurately recognize more objects than the number of examples that it was trained. Here, a concept of "shots" (to sample within a squeezed space model) is used to alter training data to emulate a noisy environment. A "shot" represents an uncertainty index that is the average of all shots from the sampling. A squeezed space model is a model created to train neural network to learn and "drown" out the noise introduced by a squeeze theorem/function. The squeeze theorem (i.e., $g(x) \leq f(x) \leq h(x)$) is also known as pinching theorem where two functions are squeezed together at particular point and if a function is trapped between them then that function will get squeezed to the same point (see FIG. 4). This can be express mathematically below:

$$\lim_{x \to a} f(x) = \lim_{x \to a} h(x) = L \text{ and therefore, } \lim_{x \to a} g(x) = L$$

Embodiments provides the following advantages over existing neural network training techniques: i) the shot number represents an uncertainty index, ii) The sampling number represents internal sensor noise, iii) Define a squeezing space based on learned environments and iv) define a squeezing space based on human uncertainty. Additionally, the number of cycles, C, in the squeezing space can be randomly sampled. It is noted that the value C is determined by another multiple regression equation using the environment and user risk tolerance.

Furthermore, the approach minimizes prior beliefs and bias from a path planning process associated with training neural network (or quantum circuits/computing) with under or over training (i.e., overfitting or underfitting) and human interpretation. The approach emulates environmental noise as well as operational instrument error (i.e., internal noise). Environmental noise is noised generated by environmental factors such as, but it is not limited to, snow, rain, fog, path blockage, missing driving lane line, obfuscation, etc. Operational instrumental error is an error generated by measurement instruments such as, but it is not limited to, control electronics, heat, impurities in semiconductor materials, etc.

In other embodiments, advantages of the embodiment can be enumerated as follows: i) squeezing algorithm produces a sampling space for environmental uncertainty, ii) high and low equations for squeezing is modeled from the environment, iii) high and low equations for squeezing is modeled from the user, iv) high and low equations for squeezing is modeled from the environment and use, v) the number of cycles within the squeezing sampling space is determined by both user and environment and vi) the squeezing sampled number is related to operational instrument anomaly detection during online training.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating a topology of a squeeze noise environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Squeeze noise environment 100 includes client computing device 102, instruments 103, operator 104 and noise server 110. All (e.g., 102, 103 and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between noise server 110 and other computing devices (not shown) within squeeze noise environment 100. It is noted that other computing devices can include, but is not limited to, client computing device 102 and any electromechanical devices capable of carrying out a series of computing instructions.

Client computing device 102 represents a network capable mobile computing device that may receive and transmit confidential data over a wireless network. Mobile computing device 102 can be a laptop computer, tablet computer, netbook computer, personal computer (PC), a personal digital assistant (PDA), a smart phone, smart watch (with GPS location) or any programmable electronic device capable of communicating with server computers (e.g., noise server 110) via network 101, in accordance with an embodiment of the present invention.

Instruments 103 represents one or more equipment used to measure noise. Instruments 103 can also include array of sensors for measuring noise. It is noted that noise can represent a physical obstruction, an obfuscation in a physical environment. However, noise can also include corrupted data that a system (e.g., neural network, quantum computing, etc.) cannot understand an interpret correctly. Thus, instruments 103 can measure slight deviation (i.e., environment noise) in quantum computing.

Operator 104 represents users of the instruments 103 or client computing device 102. Operator 104 can also represent the actor being trained on the neural network. It is noted that operator 104 can be a human and/or an autonomous robot.

Noise server 110 can be a standalone computing device, a management server, a web server, a mobile computing device, or any other electronic device or computing system capable of receiving, sending, and processing data. In other embodiments, noise server 110 can represent a server computing system utilizing multiple computers as a server system, such as in a cloud computing environment. In another embodiment, noise server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, noise server 110 represents a computing system utilizing clustered computers and components (e.g., database server computers, application server computers, etc.) that act as a single pool of seamless resources when accessed within squeeze noise environment 100.

Noise server 110 includes noise component 111 and database 116.

Noise component 111 enables the present invention to train a neural network to ignore various noise anomalies (e.g., internal/instrumentation noise, operator noise/bias, environmental noise). Noise component 111 will be described in greater details in regard to FIG. 2.

Database 116 is a repository for data used by noise component 111. Database 116 can be implemented with any type of storage device capable of storing data and configuration files that can be accessed and utilized by noise server 110, such as a database server, a hard disk drive, or a flash memory. Database 116 uses one or more of a plurality of techniques known in the art to store a plurality of information. In the depicted embodiment, database 116 resides on noise server 110. In another embodiment, database 116 may reside elsewhere within squeeze noise environment 100, provided that noise component 111 has access to database 116. Database 116 may store information associated with, but is not limited to, corpus knowledge of mathematical and statistical models, neural network training, quantum computing, noise functions, etc.

Figure 2:
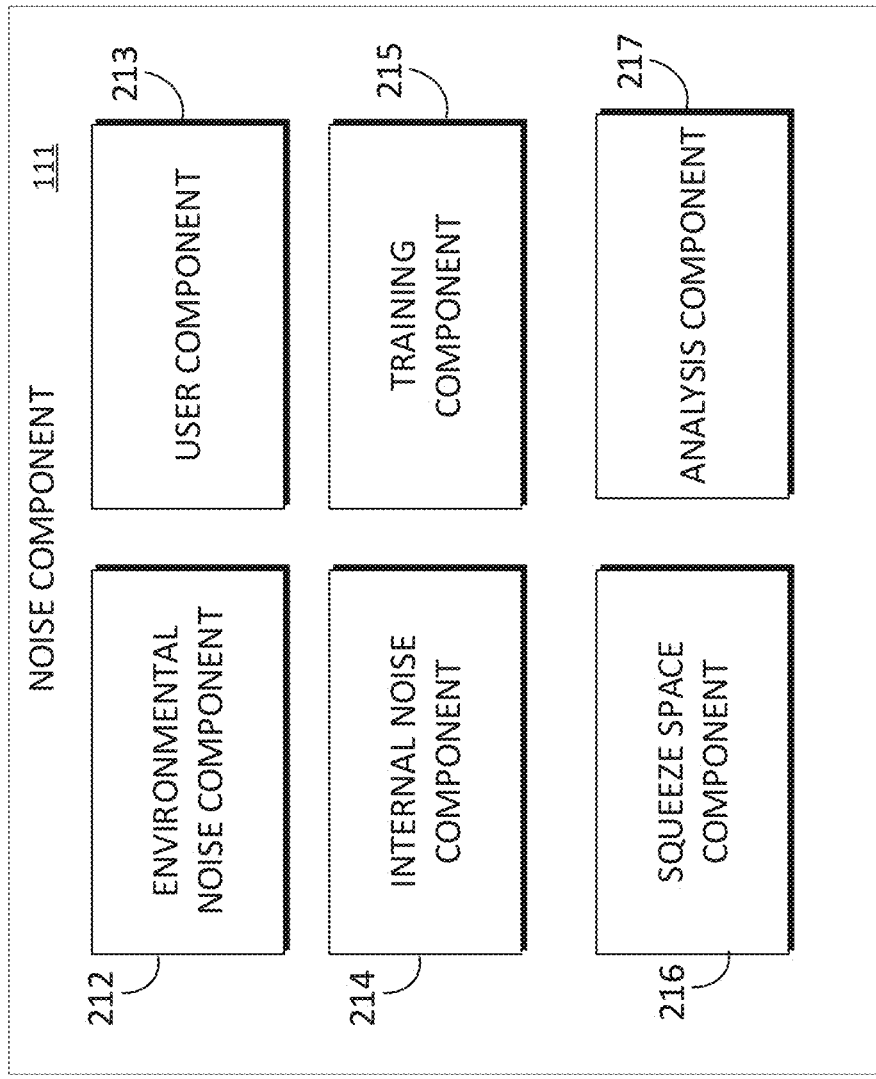
FIG. 2 is a functional block diagram illustrating noise component in accordance with an embodiment of the present invention.

FIG. 2 is a functional block diagram illustrating noise component 111 in accordance with an embodiment of the present invention. In the depicted embodiment, noise component 111 includes environmental noise component 212, user component 213, internal noise component 214, training component 215, squeeze space component 216 and analysis component 217.

As is further described herein below, environmental noise component 212, of the present invention provides the capability of emulating environmental noise by generating a random noise function. Any existing techniques of generating random noise can be used (e.g., Poisson, Gaussian, etc.).

As is further described herein below, user component 213, of the present invention provides the capability of modeling a user noise as a random noise function. For example, stress level of user (i.e., 104 of FIG. 1) can be introduced and modeled as a noise function. Examples of user stress can include, but it is not limited to, i) situational fatigue (i.e., commenter has to respond quickly and find the right/most appropriate way to respond under pressure, ii) emotional fatigue (i.e., commentator boredom) and iii) duration fatigue (i.e., commentator has to provide a sustained performance over a long period of time). Any existing techniques of generating random noise can be used (e.g., Poisson, Gaussian, etc.).

As is further described herein below, internal noise component 214, of the present invention provides the capability emulating internal noise by generating a random noise function. Any existing techniques of generating random noise can be used (e.g., Poisson, Gaussian, etc.).

As is further described herein below, training component 215, of the present invention provides the capability managing the training process of a computing process (e.g., neural network, quantum computing, etc.). For example, training component 215 can pull in a large dataset of images to train a neural network to recognize personA from those image set.

Another embodiment of training component 215 allows users to add different test cases to existing training scenarios. Based on the prior example, a neural network has been trained to recognized personA from a different set of images. However, user 1 would like to include a test case in the training process where some images of the personA is obscured (i.e., adding an "unseen" environment).

As is further described herein below, squeeze space component 216, of the present invention provides the capability modeling a squeeze space based on inputs from environment noise component 212, user component 213 and internal noise component 214. Noise function component 216 can apply the squeeze theorem based on the three inputs to create a squeeze space function (or squeezed space model). For example, environmental noise component 212 is used to create the upper bound of the squeeze function, internal noise component 214 is used to create the lower bound of the squeeze function and user component 213 is used to generate a middle squeezed function (that bounded by the upper and lower bound) as a squeeze noise function. The initial values (on the Y axis) is used to approximate each input (upper bound, lower bound and middle). Squeeze space component 216 can generate an output as a squeeze noise function based on the three inputs (e.g., environmental noise, internal noise, and user).

As is further described herein below, analysis component 217, of the present invention provides the capability calculating the average noise index (ANI) based on the sampling of the squeezed space model (output created by squeezed space component 216). Using the previous example of the squeezed space model that was created by squeeze space component 216, as time progresses and more samples are used based on the current space (Y axis) cycle, the initial approximation eventually converges into a more accurate (normalized) representation of the function. It is noted that typically, one cycle/space is used for as a sampling rate/interval/frequency but using three different space/cycle (i.e., using all three axis such as X-Y-Z axis) can provide a better convergence on the training data. For example, during the online training process, noise is detected within the dataset. The noise ratio is 50% (i.e., 50% of the entire data set is noise). Analysis component 217 converts the noise percentage (i.e., 50%) into a raw sample score (i.e., a number, 100). Analysis component 217 will then take the raw sample score and sample the Y axis of the squeeze space function based on the raw sample score (i.e., 100 samples along the Y axis). Based on the 100 samples (data point of the Y-axis), analysis component 217 calculates the average and generate an ANI score. Thus, based on the sampling frequency of 100 times along the axis, an ANI score of 40 was calculated which means that 40% noise should be added back into the training data and/or the training process to retrain the neural network. It is noted that an ANI score can be used several times throughout the training process assuming no other input parameter changes (e.g., user, internal or environmental, etc.).

Figure 3:
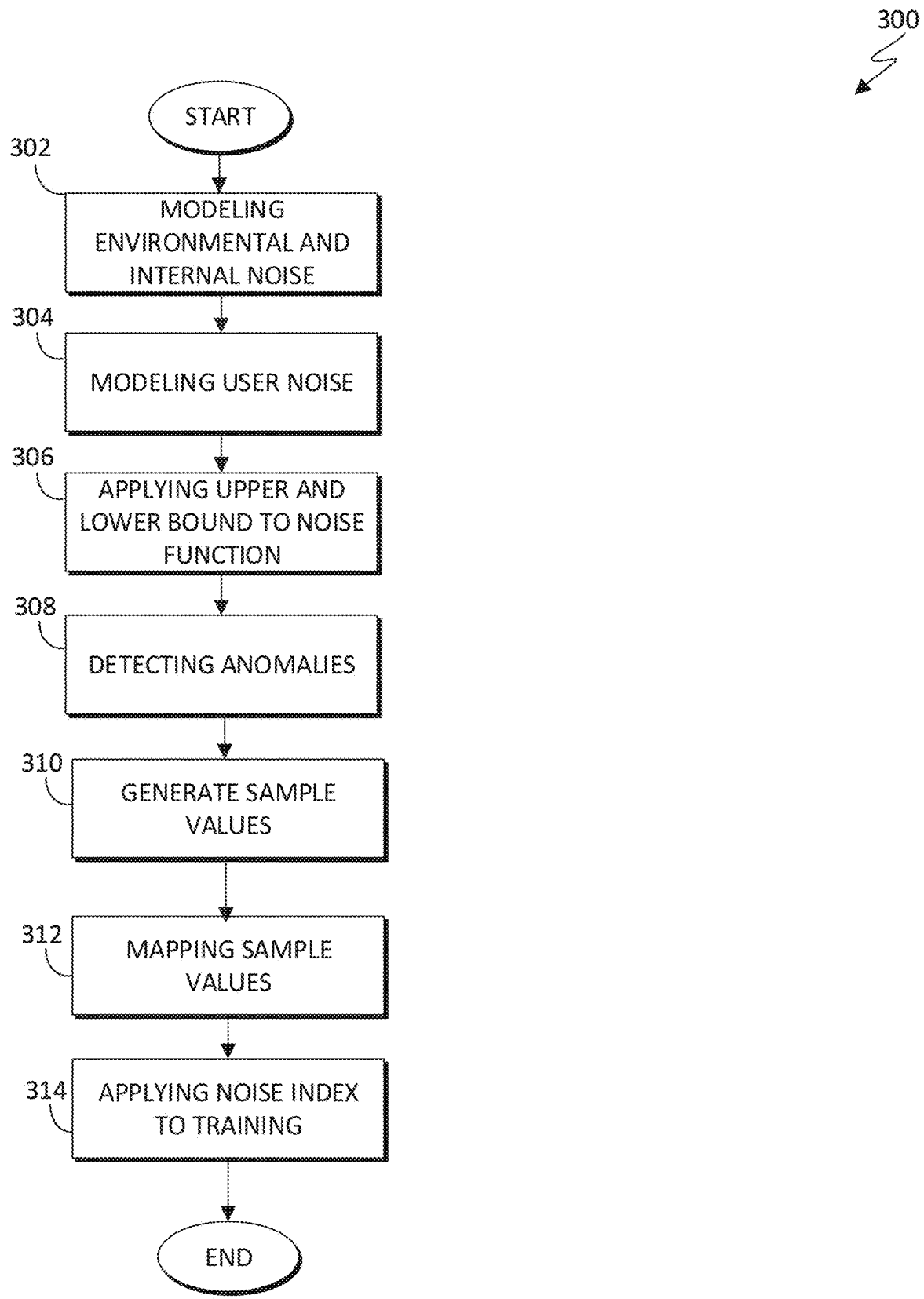
FIG. 3 is a flowchart illustrating the operation of a squeeze noise and training environment, designated as 300, in accordance with an embodiment of the present invention.

FIG. 3 is a flowchart illustrating the operation of a squeeze noise and training environment, designated as 300, in accordance with an embodiment of the present invention.

Noise component 111 models environmental noise and internal system noise (step 302). In an embodiment, noise component 111 models, through environmental noise component 212 and internal noise component 214, noises (e.g., environmental, and internal) with a polynomial regression to generate an upper bound function and a lower bound function, respectively.

Noise component 111 models user noise (step 304). In an embodiment, noise component 111 models, through user component 213, an input of a user (e.g., stress, etc.) with a polynomial regression to generate a noise function.

Noise component 111 applies the upper and lower bound function (step 306). In an embodiment, noise component 111, through squeeze space component 216, applies the upper bound function and the lower bound function to the noise function to generate a squeezed noise function.

Noise component 111 detects anomalies (step 308). In an embodiment, noise component 111, detects noise from the training data during an online training session.

Noise component 111 generates sample values (step 310). In an embodiment, noise component 111, generates sample values based on the detected noise level of the training data.

Noise component 111 maps sample values (step 312). In an embodiment, noise component 111, through analysis component 217, calculates the ANI based on the sample value on the squeezed space model. It is noted that sampling space is bounded by the squeeze noise function.

Noise component 111 applies the noise index to training (step 314). In an embodiment, noise component 111, applies the ANI to the training data during training to alter the training data (i.e., emulating a noisy environment).

Figure 4:
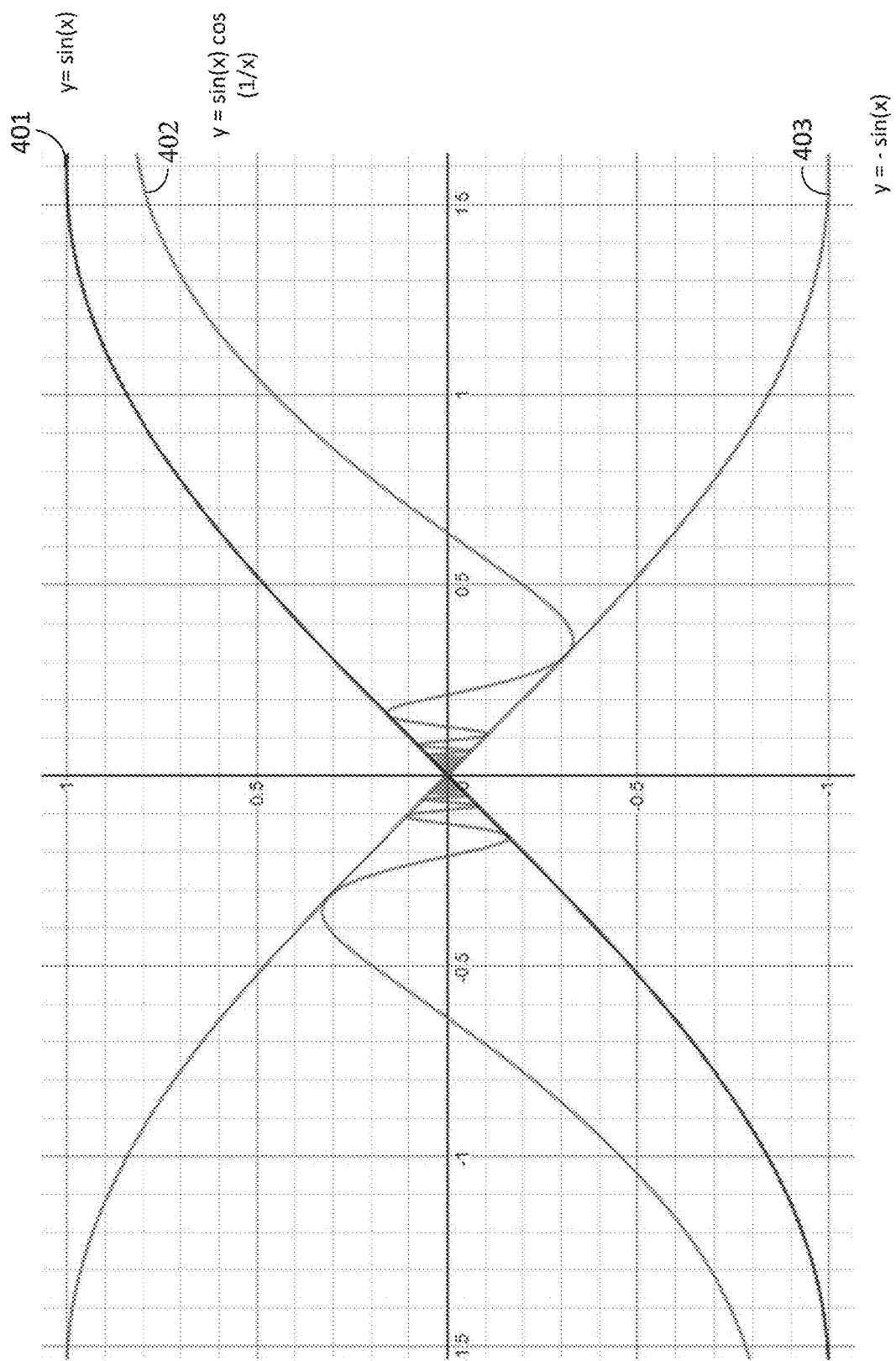
FIG. 4 is a graphical plot of a normal squeeze function, in accordance with an embodiment of the present invention.

FIG. 4 is a graphical plot of a typical squeeze function, in accordance with an embodiment of the present invention. The squeeze function can be defined as the following generally equation:

$$\lim_{x \to a} f(x) = \lim_{x \to a} h(x) = L$$

and therefore, $$\lim_{x \to a} g(x) = L$$

Specifically, the equations used in FIG. 4, the upper bound function (401) can be expressed as y=sin(x), lower bound function (403) can be expressed as y=-sin(x) and the middle function (402) can be expressed as $$y = \sin(x)\cos\left(\frac{1}{x}\right).$$

Figure 5A:
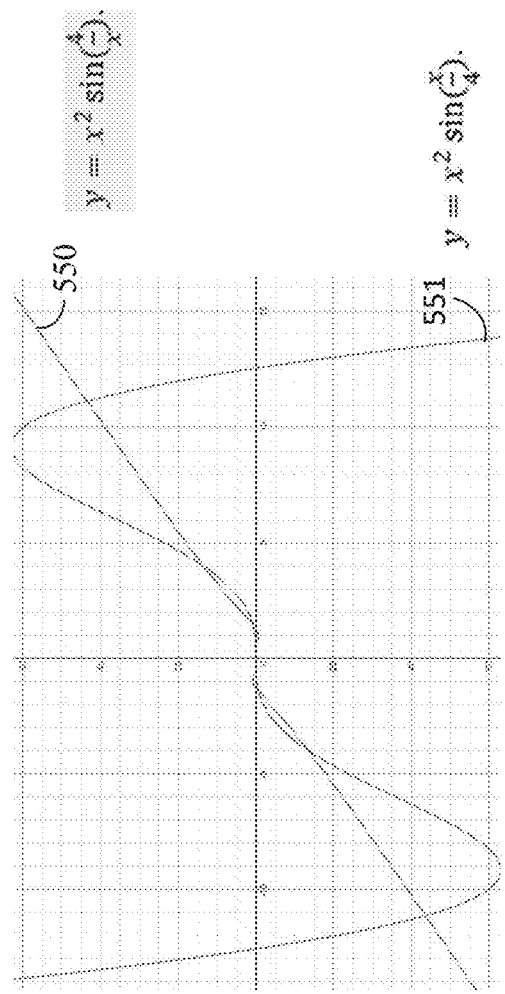
FIG. 5A is a graphical plot of a modified squeeze function, in accordance with an embodiment of the present invention.

FIG. 5A is a graphical plot of a modified squeeze function, in accordance with an embodiment of the present invention. Function 550 can be defined as $$y = x^2 \sin\left(\frac{4}{x}\right).$$

Function 551 can be defined as $$y = x^2 \sin\left(\frac{x}{4}\right).$$

The graph is plotted over an X-axis range of -12 to 12 with the Y-axis range of -60 to 60.

Figure 5B:
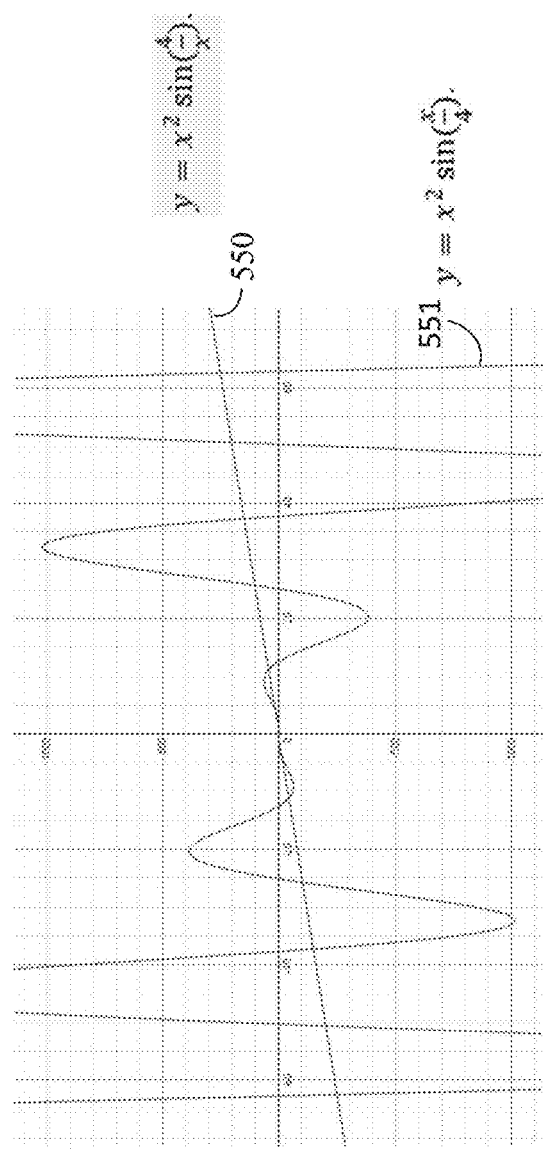
FIG. 5B is a graphical plot of the modified squeeze function of FIG. 5A, in accordance with an embodiment of the present invention.
Figure 5:
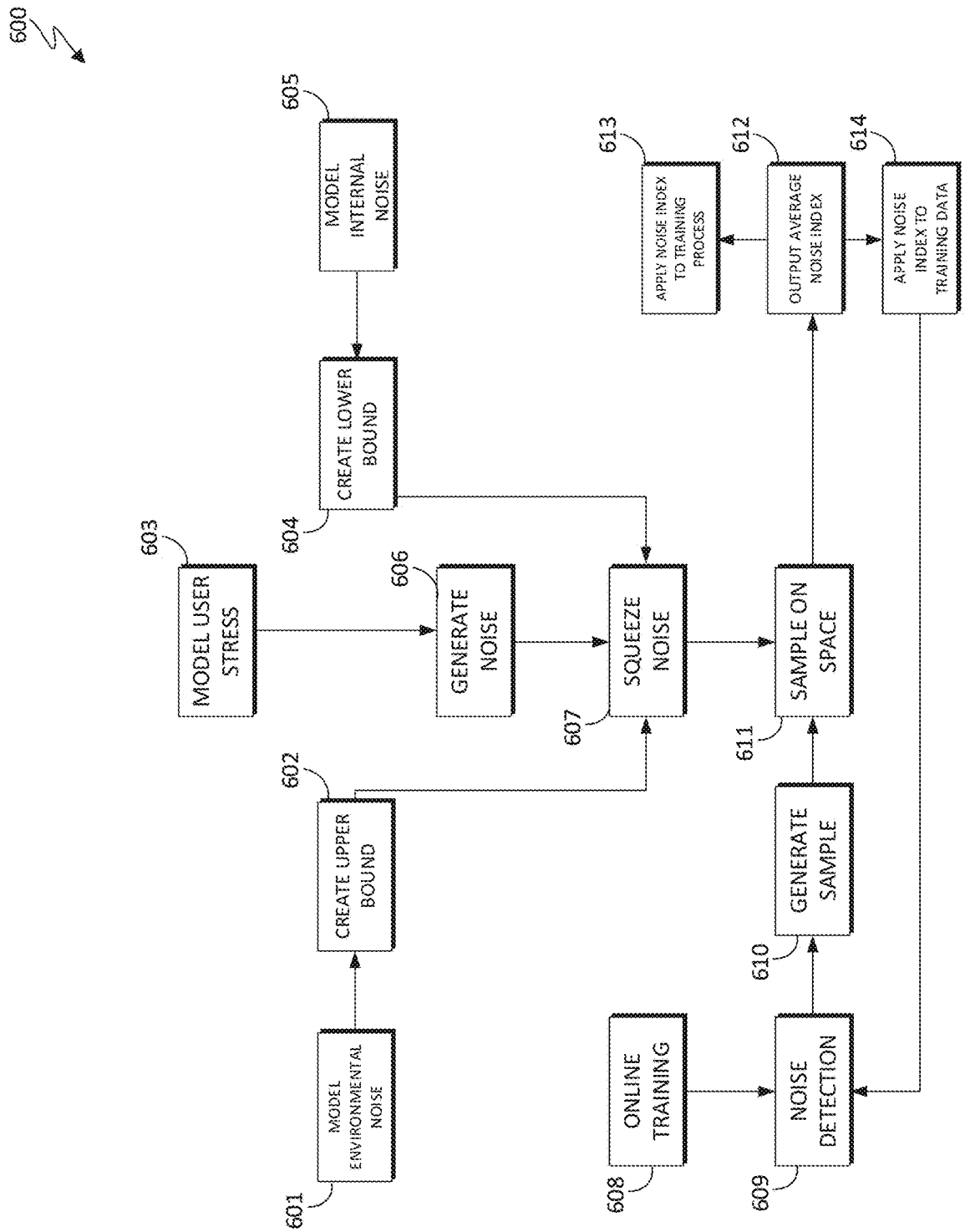

FIG. 5B is a graphical plot of a modified squeeze function from FIG. 5A, in accordance with an embodiment of the present invention. However, the graph of 5B versus 5A is plotted over an X-axis range of -77 to 77 with the Y-axis range of -1200 to 1200. In general, the 4/x portion of $$y = x^2 \sin\left(\frac{4}{x}\right)$$

can be interchanged with another variable set, w/x, where w changes the shape of the squeezing function. Hence, the smaller the x value within the sine function, the more spikes in the shape.

The hyper parameter of w can be learned (i.e., calculated) through the environmental characteristics and risk tolerance of a user. Environmental predictors such as hue, brightness, color dominance, glare, and biometrics from users (e.g., heart rate variability) are sent to the multiple regression formula to determine w. In addition, c, the number of cycles in the squeezing space can be randomly sampled. The value c is determined by another multiple regression method using environmental and user risk tolerance as variables. The higher the value c, (i.e., number of samples), the more accurate ANI is calculated. When w is calculated, the shape of the upper and lower bounds are of sampling space (i.e., squeezed space model) is known. Furthermore, when c is determined, the X-axis range to sample can also be determined (i.e., how far towards infinity). It is noted that the sampling space provides a quantum uncertainty number that is normalized to high and low shots available on a quantum computer or simulator.

FIG. 6 is a flowchart illustrating an example use case detailing the operation of a squeeze noise and training environment, designated as 600, in accordance with an embodiment of the present invention.

In the present embodiment, environmental noise is modeled (step 601). Environmental noise is regressed/represented via polynomial regression. Embodiment generates the upper bound (step 602). Representative model of environmental noise is configured as the upper bound portion squeeze function. In the present embodiment, internal noise is modeled (step 605). Internal noise (i.e., operational instrumental noise) is regressed/represented via polynomial regression. Embodiment generates the lower bound (step 604). Internal noise is configured as the lower bound portion of the squeeze function. It is noted that internal noise has less variance than the environmental noise. For example, sensors on brakes overheating (i.e., internal noise) versus weather related phenomena (i.e., environmental noise). Embodiment models the user stress/noise (step 603). User stress can be represented via a polynomial regression. Hence, a random noise function can be generated to model the user's stress (step 606). For example, a user can be a person or a robot driving a vehicle and measurements of the stress level is introduced associated with the human/robot driver. It is noted that there are at least three inputs used to create a squeeze noise function.

Embodiment receives all three inputs (e.g., user stress, environmental noise, and internal noise) and creates a noise function. Embodiment, through squeeze space component 216, creates a squeezed space model based on the three inputs (step 607). It is noted that the upper and lower bounds and user stress function begin as approximation (i.e., steps 602, 604 and 606). As time/sample size increase, the functions become more distinct and refined (step 607).

Training commences (step 608). Embodiment can begin online training of the neural network. For example, a neural network is being trained for facial recognition from a large dataset contains pictures of the same individual, personA. Amongst the existing dataset of personA, there are a couple of pictures personA's face is slightly obscured. Some pictures are obscured by snow, tree branch, etc.

Neural network detects a noise (step 609). Embodiment detects a noise as an anomaly during the training process. For example, the noise is in the form of a blockage/obscuration of the personA's face in the picture.

Embodiment generates a sample value (step 610). Noise component 111 calculates the amount of noise that was detected in the previous step. The noise percentage will be converted into a raw number which will be used as sample number. For example, neural network determines that 50% of the trained dataset contains noise/anomalies. Noise component 111 converts the 50% into a raw sample score of 100 (sample value).

Embodiment begins to sample the squeezed space model (step 611). After squeeze noise function is created (step 607) in the squeezed space model, noise component 111, through analysis component 217, commences to randomly sample the noise function within the squeeze space/function based on the sample value. For example, based on the previous steps, noise component 111 determined a sample value of 100. That sample value (i.e. shots) is used to perform 100 random samplings on the squeezes space (i.e., along the Y axis).

Embodiments outputs the average noise index (step 612). Average noise index (ANI) is calculated by averaging the values along the Y axis based on the upper and lower bound of the functions to create an ANI number. For example, the ANI score calculated is 40 based on the 100 random samples from step 611.

Embodiments applies the noise index to the training process (step 613). Based on the previous step (step 612), ANI score of 40 is used as a basis to determine the amount of (i.e., environmental noise) noise to add back into the training process in order to train neural network to overcome noisy process. Thus, 40% noise is added back into the training process by altering the Y-axis of the generated noise function. It is noted that the added noise can be generated using any existing noise generating techniques in the art (e.g., Poisson, Gaussian, etc.)

Embodiments applies the noise index to the training data (step 614). Based on the previous step (step 612), ANI score of 40 is used as a basis to determine the amount of noise to add back into the training data in order to train neural network to overcome noisy dataset. Thus, 40% noise is added back into the training data and the added noise can be re-detected by step 609 in the next iteration of the training process of the neural network.

In summary, the steps of 600 can be reiterated as follows: i) environmental noise is regressed via polynomial regression and learned through upper and lower bound equations; ii) environmental noise learning is applied during training; iii) the operational instrument error is mapped to anomaly detection of sensor data; iv) both of the environmental and operational instrument error is applied during training and v) a calculated average noise index is determined and applied to training process and data. Generally, a high number of samples within the squashed space will find the dominant number of shots. The smaller the sampling space, the more variance will occur.

Figure 7:
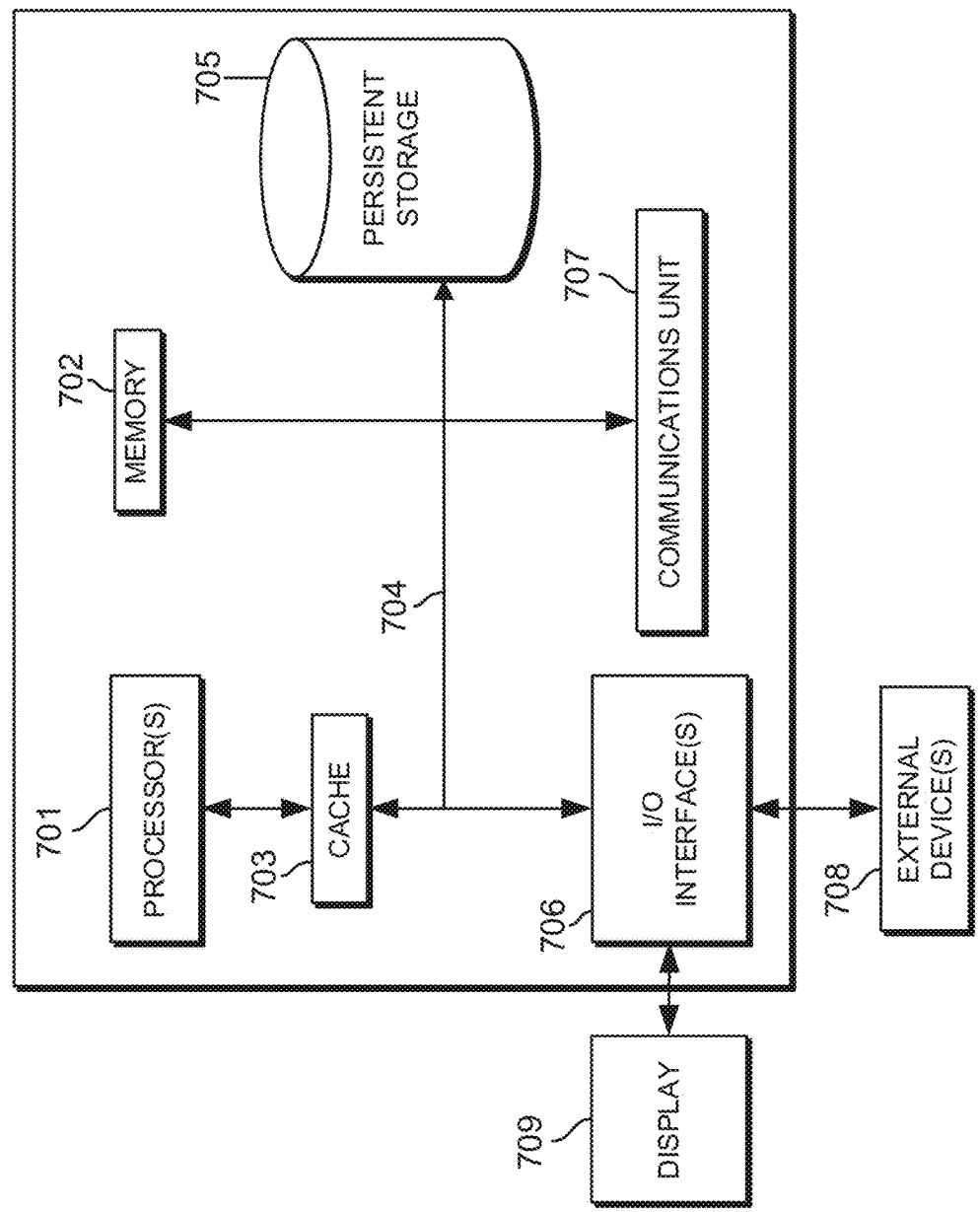
FIG. 7 depicts a block diagram, designated as 700, of components of a server computer capable of executing the noise component within the squeeze noise environment, of FIG. 1, in accordance with an embodiment of the present invention.

FIG. 7 depicts a block diagram, designated as 700, of components of noise component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 7 includes processor(s) 701, cache 703, memory 702, persistent storage 705, communications unit 707, input/output (I/O) interface(s) 706, and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processor(s) 701 by holding recently accessed data, and data near recently accessed data, from memory 702.

Program instructions and data (e.g., software and data) used to practice embodiments of the present invention may be stored in persistent storage 705 and in memory 702 for execution by one or more of the respective processor(s) 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Noise component 111 can be stored in persistent storage 705 for access and/or execution by one or more of the respective processor(s) 701 via cache 703.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data (e.g., noise component 111) used to practice embodiments of the present invention may be downloaded to persistent storage 705 through communications unit 707.

I/O interface(s) 706 allows for input and output of data with other devices that may be connected to each computer system. For example, I/O interface(s) 706 may provide a connection to external device(s) 708, such as a keyboard, a keypad, a touch screen, and/or some other suitable input device. External device(s) 708 can also include portable computer readable storage media, such as, for example, thumb drives, portable optical or magnetic disks, and memory cards. Program instructions and data (e.g., noise component 111) used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for training a neural network to be related to object identification from an image data set based on introducing noise, comprising:
    modeling an environmental noise and an internal system noise with a first and second polynomial regression to generate an upper bound function and a lower bound function, respectively;
    modeling user noise with a third polynomial regression to generate a noise function;
    applying the upper bound function and the lower bound function to the noise function to generate a squeezed noise function;
    detecting anomalies within a training data during an online training;
    generating sample values from the detected anomalies;
    mapping the sample values to a squeezed space model via the squeezed noise function to calculate an ANI (average noise index) within the sampled squeezed space model bounded by the squeezed noise function; and
    adding a percentage of noise based on the ANI to the training data during training to alter the training data, in order to emulate a noisy environment.

2. The computer-implemented method of claim 1, wherein generate the upper bound function and the lower bound function, further comprises:
    applying a first function, $h(x)$, of a squeeze theorem, $g(x) \leq f(x) \leq h(x)$, to the upper bound function; and
    applying a second function, $g(x)$, of the squeeze theorem, to the lower bound function.

3. The computer-implemented method of claim 1, wherein generating sample values from the detected anomalies, further comprises:
    measuring a noise amount from the detected anomalies, calculating an overall noise percentage based on the training data and the noise amount; and
    converting the noise percentage into a raw sample score.

4. The computer-implemented method of claim 3, wherein calculate the average noise index, further comprises:
    retrieving the raw sample score;
    sampling iteratively along an axis of the squeezed space model over an interval equal to the raw sample score and averaging values from the sampling that was done iteratively along the axis of the squeezed space model; and
    generating the average noise index based on the averaged value from the sampling.

5. The computer-implemented method of claim 1, wherein the anomalies further comprises, environment noise, internal noise, and the user noise.

6. The computer-implemented method of claim 1, wherein the environmental noise further comprises, snow, rain, fog, path blockage, missing driving lane line and obfuscation.

7. The computer-implemented method of claim 1, wherein internal noise further comprises, control electronics, heat, and impurities in semiconductor materials.

8. A computer program product for training a neural network to be related to object identification from an image data set based on introducing noise, the computer program product comprising:
    one or more computer readable and non-transitory storage media and program instructions stored on the one or more computer readable non-transitory storage media, the program instructions comprising:
    program instructions to model an environmental noise and an internal system noise with a first and second polynomial regression to generate an upper bound function and a lower bound function, respectively;
    program instructions to model user noise with a third polynomial regression to generate a noise function;
    program instructions to apply the upper bound function and the lower bound function to the noise function to generate a squeezed noise function;
    program instructions to detect anomalies within a training data during an online training;
    program instructions to generate sample values from the detected anomalies;
    program instructions to map the sample values to a squeezed space model via the squeezed noise function to calculate an ANI (average noise index) within the sampled squeezed space model bounded by the squeezed noise function; and program instructions to add a percentage of noise based on the ANI to the training data during training to alter the training data, in order to emulate a noisy environment.

9. The computer program product of claim 8, wherein generate the upper bound function and the lower bound function, further comprises:
program instructions to apply a first function, h(x), of a squeeze theorem, $g(x) \leq f(x) \leq h(x)$, to the upper bound function; and
program instructions to apply a second function, g(x), of the squeeze theorem, to the lower bound function.

10. The computer program product of claim 8, wherein generating sample values from the detected anomalies, further comprises:
program instructions to measure a noise amount from the detected anomalies, calculating an overall noise percentage based on the training data and the noise amount; and
program instructions to convert the noise percentage into a raw sample score.

11. The computer program product of claim 10, wherein calculate the average noise index, further comprises:
program instructions to retrieve raw sample score;
program instructions to sample iteratively along an axis of the squeezed space model over an interval equal to the raw sample score and averaging values from the sampling that was done iteratively along the axis of the squeezed space model; and
program instructions to generate the average noise index based on the averaged value from the sampling.

12. The computer program product of claim 8, wherein the anomalies further comprises, environment noise, internal noise, and the user noise.

13. The computer program product of claim 8, wherein the environmental noise further comprises, snow, rain, fog, path blockage, missing driving lane line and obfuscation.

14. The computer program product of claim 8, wherein internal noise further comprises, control electronics, heat, and impurities in semiconductor materials.

15. A computer system for training a neural network to be related to object identification from an image data set based on introducing noise, the computer system comprising:
one or more computer processors;
one or more computer readable non-transitory storage media;
program instructions stored on the one or more computer readable non-transitory storage media for execution by at least one of the one or more computer processors, the program instructions comprising:
program instructions to model an environmental noise and an internal system noise with a first and second polynomial regression to generate an upper bound function and a lower bound function, respectively;
program instructions to model user noise with a third polynomial regression to generate a noise function;
program instructions to apply the upper bound function and the lower bound function to the noise function to generate a squeezed noise function;
program instructions to detect anomalies within a training data during an online training;
program instructions to generate sample values from the detected anomalies;
program instructions to map the sample values to a squeezed space model via the squeezed noise function to calculate an average noise index within the sampled squeezed space model bounded by the squeezed noise function; and
program instructions to add a percentage of noise based on the ANI to the training data during training to alter the training data, in order to emulate a noisy environment.

16. The computer system of claim 15, wherein generate the upper bound function and the lower bound function, further comprises:
program instructions to apply a first function, h(x), of a squeeze theorem, $g(x) \leq f(x) \leq h(x)$, to the upper bound function; and
program instructions to apply a second function, g(x), of the squeeze theorem, to the lower bound function.

17. The computer system of claim 15, wherein generating sample values from the detected anomalies, further comprises:
program instructions to measure a noise amount from the detected anomalies, calculating an overall noise percentage based on the training data and the noise amount; and
program instructions to convert the noise percentage into a raw sample score.

18. The computer system of claim 17, wherein calculate the average noise index, further comprises:
program instructions to retrieve the raw sample score;
program instructions to sample iteratively along an axis of the squeezed space model over an interval equal to the raw sample score and averaging values from the sampling that was done iteratively along the axis of the squeezed space model; and
program instructions to generate the average noise index based on the averaged value from the sampling.

19. The computer system of claim 15, wherein the environmental noise further comprises, snow, rain, fog, path blockage, missing driving lane line and obfuscation.

20. The computer system of claim 15, wherein internal noise further comprises, control electronics, heat, and impurities in semiconductor materials.

* * * * *